May 7, 1940.  H. PERRY ET AL  2,199,511
PROCESS AND APPARATUS FOR TEMPERING GLASS
Filed Sept. 30, 1935  5 Sheets-Sheet 1

Harold Perry
Augustus William Grotefeld
INVENTORS their ATTY.

May 7, 1940. H. PERRY ET AL 2,199,511
PROCESS AND APPARATUS FOR TEMPERING GLASS
Filed Sept. 30, 1935  5 Sheets-Sheet 3

Harold Perry
Augustus William Grotefeld
INVENTORS
By Otto Munk
their ATTY.

Harold Perry
Augustus William Grotefeld
INVENTORS
their ATTY.

Patented May 7, 1940

2,199,511

UNITED STATES PATENT OFFICE 2,199,511

PROCESS AND APPARATUS FOR TEMPERING GLASS

Harold Perry, Stone, and Augustus William Grotefeld, Stafford, England, assignors to Gilt Edge Safety Glass Limited, Stone, England, a company of Great Britain Application September 30, 1935, Serial No. 42,770 In Great Britain October 3, 1934

6 Claims. (Cl. 49—45)

This invention relates to a process and apparatus for tempering glass wherein the surface of the latter, when at a comparatively high temperature generally at, or approaching that of softening, is subjected to a cooling medium and cooled rapidly to produce the required toughness or temper.

The invention is primarily intended for application to the tempering of glass sheets, such as for example, those used in automobile windshields, table tops, shelves or like articles wherein it is desired that the glass shall be capable of resisting blows or shocks.

In connection with the tempering of glass sheets it is already well known to suspend the heated sheets in a vertical position and to discharge jets of compressed air simultaneously and at right angles to the two faces of the sheet, such jets being distributed regularly over the said faces so that the latter are cooled uniformly to the requisite extent.

Further, with a view to enhancing the uniformity of the cooling it is known to move the jets and sheets relatively in a direction within the plane of the latter during tempering.

As is well known, however, the cooling capacity of air, like that of all gases, is low, so that a considerable quantity of compressed air has to be employed to produce the necessary cooling, so that the running cost of the plant is in consequence increased.

Further, as a result of the low cooling capacity of the air the rate of tempering is, with the above process, comparatively slow.

The primary object of the present invention is to increase the rate of tempering and to reduce the running cost of the plant.

Other objects will be apparent from the following description.

Referring to the drawings—

In the construction illustrated in Figures 1 to 12, the plant comprises a furnace shown generally at 15 for heating the glass sheets to the required temperature for tempering, and apparatus shown generally at 16 for cooling the glass sheets rapidly to impart thereto the requisite toughness or temper.

Figure 1:
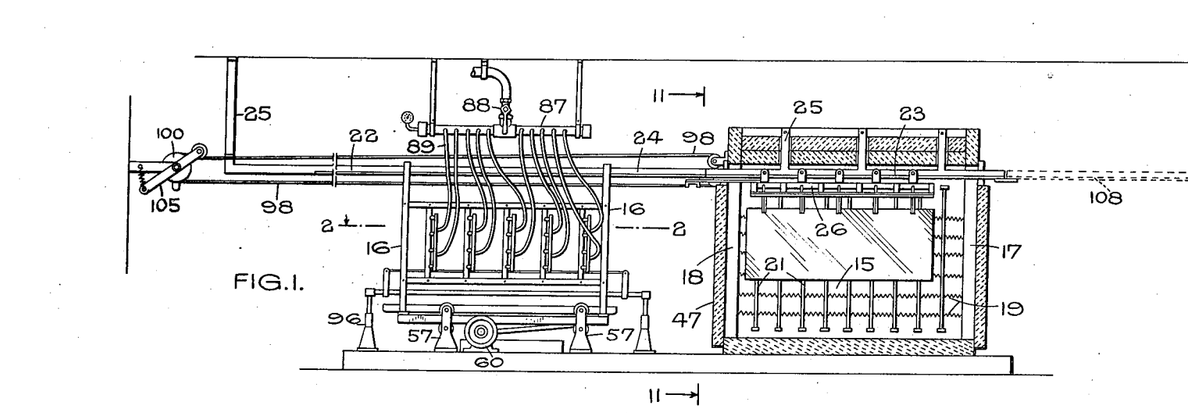
Figure 1 is a side elevation of a complete plant for use in tempering glass sheets showing both the cooling apparatus and the heating furnace, the latter being illustrated in section.

The furnace is conveniently of electrical resistance type being of elongated rectangular configuration and provided at opposite ends with an inspection opening 17 and an entrance or exit opening 18.

Figure 12:
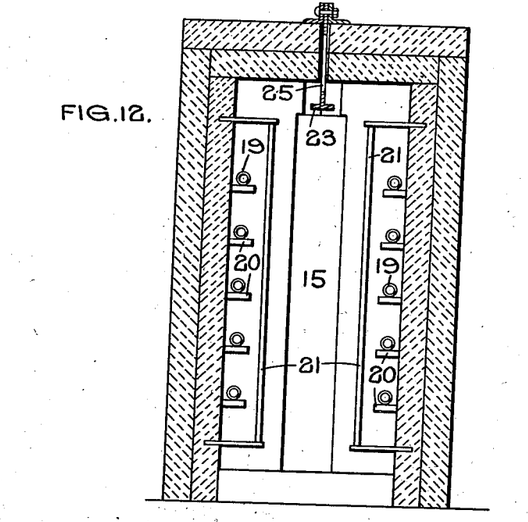
Figure 12 is a cross sectional view of the furnace shown in the preceding figure.

For heating the glass sheets, opposite sides of the furnace are provided internally with electric resistance heaters 19 of known type carried upon suitable supports 20, as shown in Figure 12, and for preventing the glass sheets from coming into contact with the resistance heaters and damaging them, for example, in the event of the sheets fracturing during heating, there are provided guards comprising spaced vertical bars 21 disposed immediately in front of the resistance heaters 19.

The size of the furnace is conveniently such that only one sheet of glass is heated at a time and the resistance heaters are preferably arranged such that each sheet can be heated conveniently to a maximum temperature of approximately 650° C., suitable thermostatic control means of known type and not shown in the drawings being provided for regulating the furnace temperature.

For supporting the sheets during the heating and subsequent tempering operations, there is provided a horizontal rail 22 formed from metal strip of inverted T section which extends through the upper part of the interior of the furnace, one end of the rail projecting beyond the exit opening 18 of the furnace.

Conveniently, the rail is built up in two sections 23 and 24, the section 23 being disposed within the furnace and being formed from heat resisting metal and the remaining section 24 which projects beyond the exit opening 18 being of ordinary mild steel.

The rail is supported from the roof of the furnace and from the building containing the plant by means of suitable supports 25.

Figures 6, 7, 8, 9, 10:
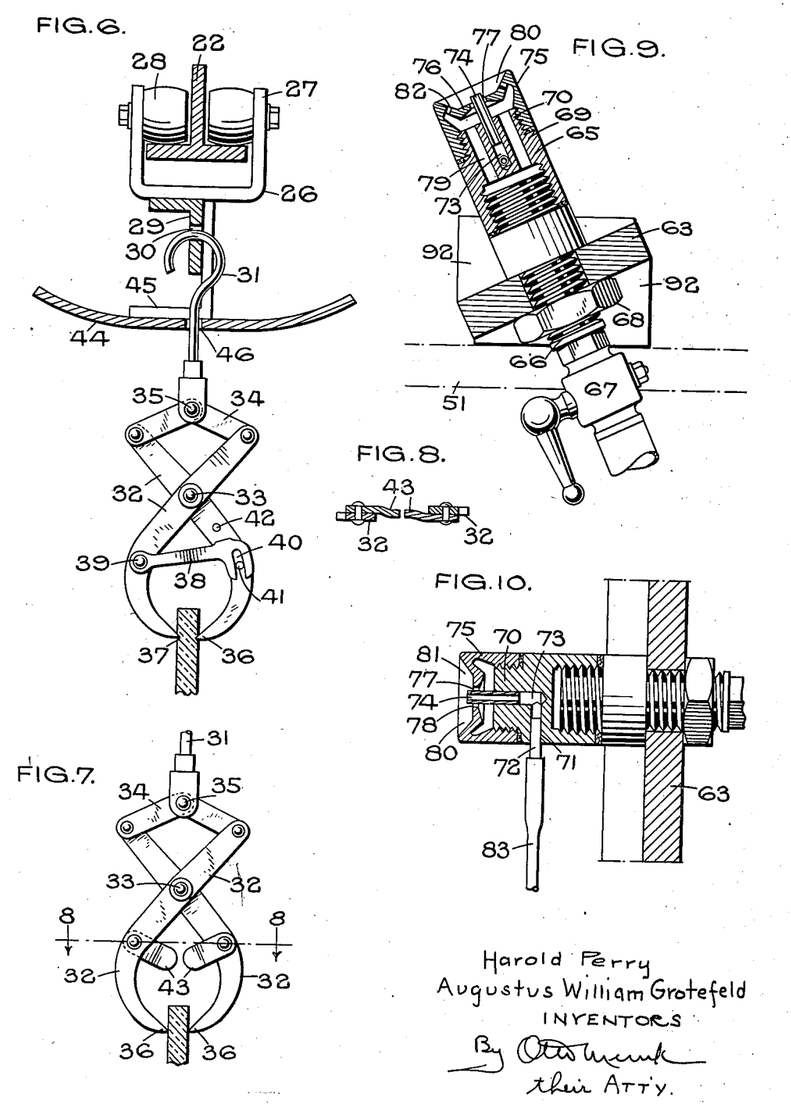
Figure 6 is a sectional view on the line 6—6 of Figure 3, illustrating one form of tongs for suspending the glass sheets.
Figure 7 is an end elevation of an alternative form of tongs.
Figure 8 is a sectional view on the line 8—8 of Figure 7.
Figures 9 and 10 are part sectional views taken at right angles to one another illustrating the nozzles employed for directing the cooling medium onto the sheets during tempering.
Figure 11:
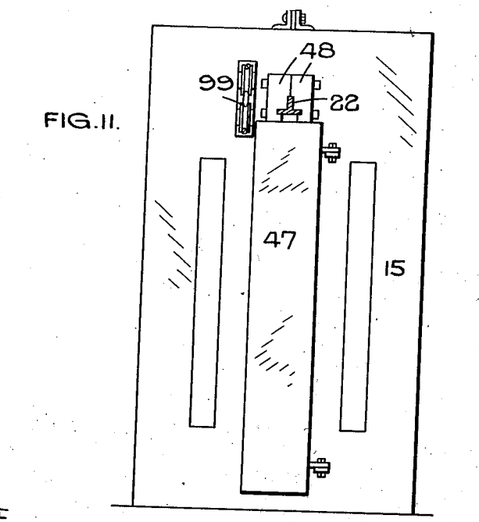
Figure 11 is an end elevation of the furnace shown in Figure 1 taken in the direction of the arrows 11—11.

The rail is provided with a plurality of carriages 26 illustrated in Figure 6, comprising metal strips 27 of U shape carrying wheels 28 which engage the rail flanges and a number of these carriages are connected together by a tongs supporting strip 29 secured to the base of the strips 27 and extending longitudinally of the rails and this strip is provided with a plurality of spaced holes 30 for the reception of hooks 31 which serve to carry tongs, shown in Figures 6 and 7, for supporting the glass sheets.

In the present apparatus two types of tongs are provided, those shown in Figure 6 being adapted to support the sheets adjacent each end thereof, and those shown in Figure 7 being adapted to provide additional support intermediate the ends.

Conveniently, both types of tongs are constructed as toggles comprising a pair of arms 32 connected pivotally intermediate their ends at 33, the upper end of each arm being pivoted to one end of a pair of links 34, connected pivotally together and to the hooks 31 at 35.

The opposite ends of the arms 32 are pointed to provide jaws 36 which, in the case of the tongs shown in Figure 6, are adapted to enter openings 37 which are drilled or otherwise formed in the faces of the glass prior to heating. It should be noted that the ends of the arms must not be too sharp, or the glass is liable to be fractured; the degree of pointing of the ends being preferably as illustrated.

The weight of the glass sheets acting upon the jaws serves to maintain the latter in gripping engagement with the sheets, but it is preferred to provide means for positively maintaining such engagement and also to prevent the jaws, under the weight of the sheets, from penetrating too deeply into the glass when this is heated within the furnace, by providing each of the tongs shown in Figure 6 with a stop comprising an arm 38 connected pivotally to one of the arms 32 at 39 and provided at its free end with a slot 40 of arcuate form which is adapted to engage a pin 41 carried by the other arm 32 of the jaws.

To permit of the stop being adjusted so that the same tongs can be employed with sheets of varying thickness, the center of the arc corresponding to the shape of the slot 40 is offset from the pivot 39, while in order to maintain the slot in engagement with the pin 41, there is provided a stop pin 42.

In the construction of tongs illustrated in Figure 7, the stop for limiting the penetration of the jaws comprises a pair of lugs 43 mounted pivotally one on each of the arms 32, and these lugs extend inwardly towards each other, and are of cranked configuration as shown in Figure 8 so that their adjacent ends can abut each other to limit the relative movement between the arms; a suitable frictional connection being provided between the arms and the lugs so that the latter may be adjusted relative thereto in accordance with the thickness of the sheets.

In both constructions, the tongs may be made of Hadfields Manganese steel or from other heat resisting metal, while if desired, all the tongs may be constructed as shown in Figure 6.

In order to minimize the distortion and corrosion of the carriages 26 and rail 22 during the heating and tempering of the sheets, there is provided a longitudinal baffle strip 44 curved in section and connected by spaced brackets 45 to the tongs supporting strip, the baffle strip being provided with openings 46 through which the hooks 31 extend freely. If desired, however, the baffle strip may be dispensed with.

For closing the openings in the furnace 15, each end thereof is provided with a main door 47 disposed beneath the rail 22, while for closing the space around the rail 22 adjacent the exit end 18 of the furnace, there is provided a pair of auxiliary doors 48.

Figure 3:
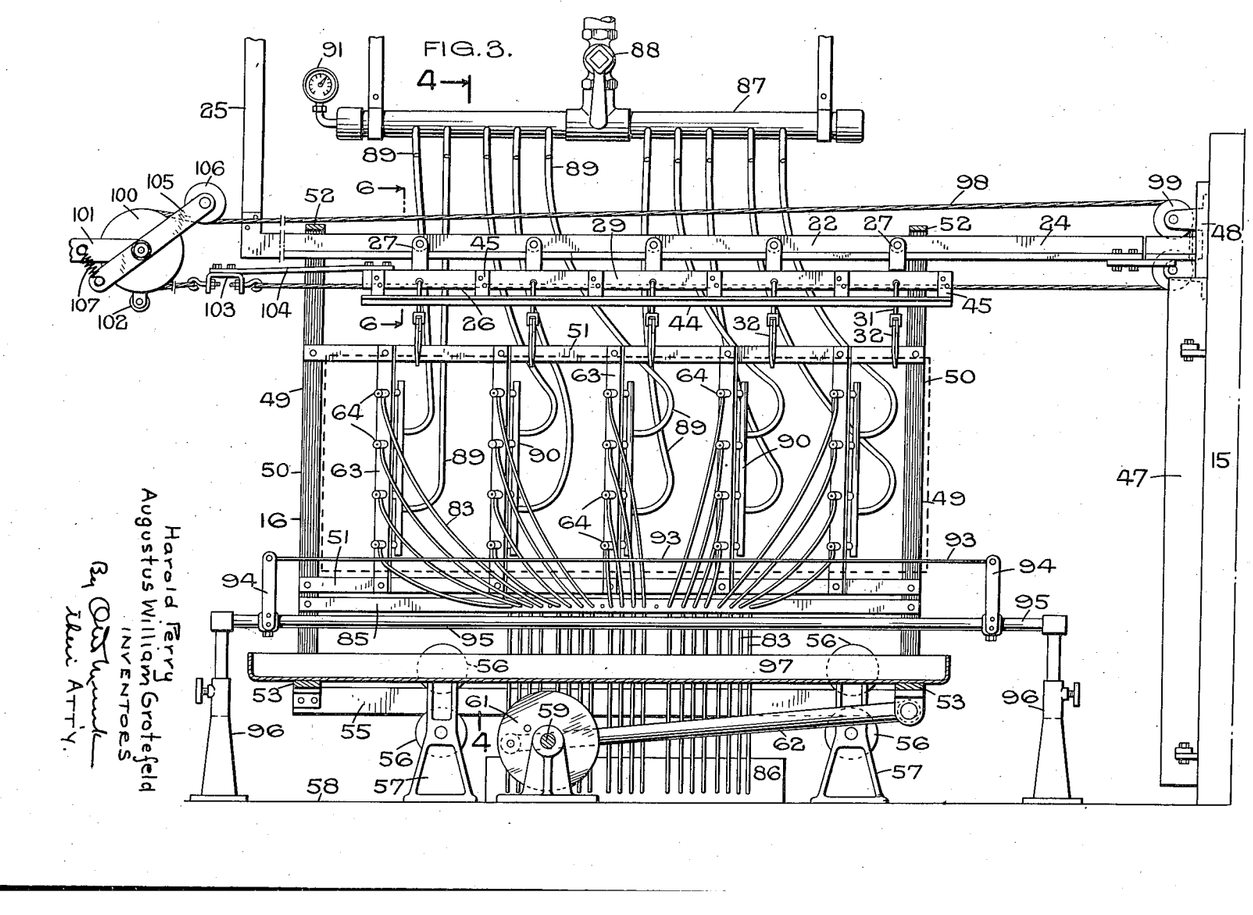
Figure 3 is an enlarged cross sectional side elevation of the cooling apparatus shown in Figure 1.

The apparatus for cooling the glass sheets after heating and shown generally at 16, comprises a pair of vertical frames 49 disposed adjacent the exit opening 18 of the furnace, the frames being spaced apart to permit of the reception of the sheets therebetween.

Figures 4, 5:
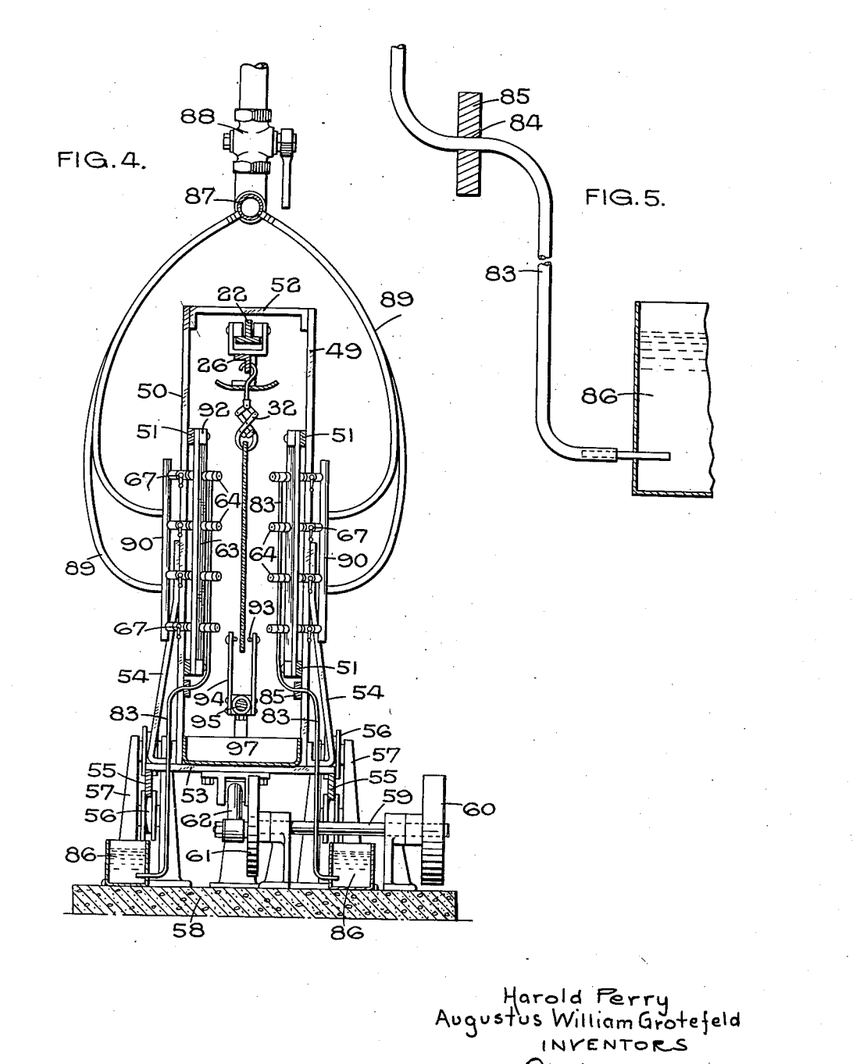
Figure 4 is a sectional view on the line 4—4 of Figure 3.
Figure 5 is an enlarged view of a detail of the construction illustrated in Figure 1.

Each frame is conveniently built up from strip metal comprising a pair of vertical struts 50 connected by a pair of spaced horizontal members 51; the two frames being maintained in spaced relationship by brackets 52 connecting the upper ends of the struts 49 and by cross strips 53 connecting the lower ends thereof. Conveniently, these cross strips project laterally beyond the struts 49, the projecting ends being connected additionally to the struts by bracing pieces 54, while to the under side of the projecting ends of the cross strips are secured longitudinal guide rails 55 of rectangular section.

The upper and lower edges of the guide rails are engaged adjacent each of their ends between a pair of grooved guide wheels 56 disposed one above the other, a pair of such guide wheels being each mounted pivotally upon one of four brackets 57 carried from the floor 58.

With such an arrangement, the two frames are movable together in a longitudinal direction, and for imparting a reciprocatory movement to the frames there is provided crank and connecting rod mechanism comprising a laterally extending driving shaft 59 provided at one end with a suitable driving pulley 60 and at the opposite end with a crank 61 carrying a connecting rod 62 pivoted also to one of the cross pieces 53. Conveniently, the throw of the crank may be made adjustable in the known manner so that the overall movement of the frames can be varied.

The horizontal members 51 of each frame carry intermediate their ends a plurality of spaced vertical nozzle carriers 63 constructed as metal strips and mounted upon these are a plurality of nozzles 64 spaced apart one above the other so that a number of horizontal rows of nozzles are provided with the nozzles of the two frames arranged opposite and extending towards one another so that they are adjacent each face of the glass sheets during cooling.

The nozzles, which are shown more clearly in Figures 9 and 10, comprise each a cylindrical hollow air chamber 65 open at one end 66, which is connected to one of a plurality of nozzle control cocks 67 of known type, such end being also shouldered and threaded externally and provided with a nut 68 for securing the nozzle in position upon the carrier 63. The other end 69 of each air chamber is closed and provided with a spigoted portion 70 which projects inwardly of the adjacent frame and this closed end is formed with a radial opening 71 within which is secured a liquid supply pipe 72 of small cross section which projects radially beyond the exterior of the nozzle.

The inner end of the tube 71 is in communication with a central cylindrical opening 73 formed in the end of the spigoted portion 70 and within this opening is mounted frictionally a cylindrical jet 74 so that the latter can be adjusted axially of the nozzle to vary the amount of liquid delivered.

The spigoted portion 70 is threaded externally for the detachable reception of a removable jet piece 75 of hollow cylindrical form and closed at one end by a circular portion 76, the latter being provided with a circular opening 77 of a diameter somewhat larger than the external diameter of the jet 74 to provide a main air discharge orifice 78 of annular configuration.

The circular portion 76 of the jet piece 75 is conveniently spaced somewhat from the adjacent end of the spigoted portion 70, such space being in communication with the main air orifice 78 and for supplying air thereto from the air chamber the spigoted portion is provided with a pair of passages 79 arranged on opposite sides of the longitudinal axis thereof.

With such an arrangement, on supplying air under pressure through the main orifice 78, a spray of liquid in a fine or substantially fine state of division is produced in the known manner, the degree of fineness being enhanced by arranging for the end of the jet 74 to project somewhat beyond the main air orifice 78 in the manner illustrated in the drawings.

In order to reduce the divergence of the spray as much as possible and to produce a substantially uniform spray over a substantial area of the adjacent face of the glass sheet, the end of the jet piece 75 is recessed inwardly at 80, the periphery of the recessed portion being of frusto-conical form at 81.

In order that the spray shall be of elongated form in cross section, the frusto-conical part 81 is formed with a pair of auxiliary air orifices 82 arranged horizontally on opposite sides of the main air orifice 78 and in communication with the air passages 79, and the axes of these auxiliary orifices are arranged to extend inwardly towards each other in a direction towards the adjacent face of the sheet to provide two separate streams of air which converge towards each other and to the central spray and deform the latter to an elongated configuration in cross section, the major axis of the elongated spray being vertical.

For supplying the liquid, which is conveniently water, to each of the nozzles, the outer end of each of the liquid supply pipes 72 is connected to one of a number of flexible rubber tubes 83 which are positioned intermediate their ends by drawing them through one of a plurality of openings 84 provided in a horizontal tube supporting strip 85 carried from the struts 49 of each frame, and the opposite ends of these tubes are connected to one of a pair of liquid supply reservoirs 86 mounted upon the floor 58 at opposite sides of the cooling apparatus, the ends of the tubes conveniently extending loosely to these reservoirs to permit of the necessary movement of the frames.

For supplying air under pressure to the nozzles, there is provided a stationary main air distribution pipe 87 extending longitudinally and centrally above the cooling apparatus 16, the pipe being connected intermediate its ends to a supply of compressed air not shown in the drawings, through the medium of a main air control cock 88, and to opposite sides of this pipe are connected a plurality of flexible air supply tubes 89 which extend downwardly therefrom to vertical distribution pipes 90 disposed one adjacent each of the nozzle carriers 63 and connected each to all of the nozzle control cocks of the adjacent nozzles.

To permit of the pressure of the air being readily determined, one end of the main distribution pipe 87 is provided with a pressure gauge 91.

Figure 2:
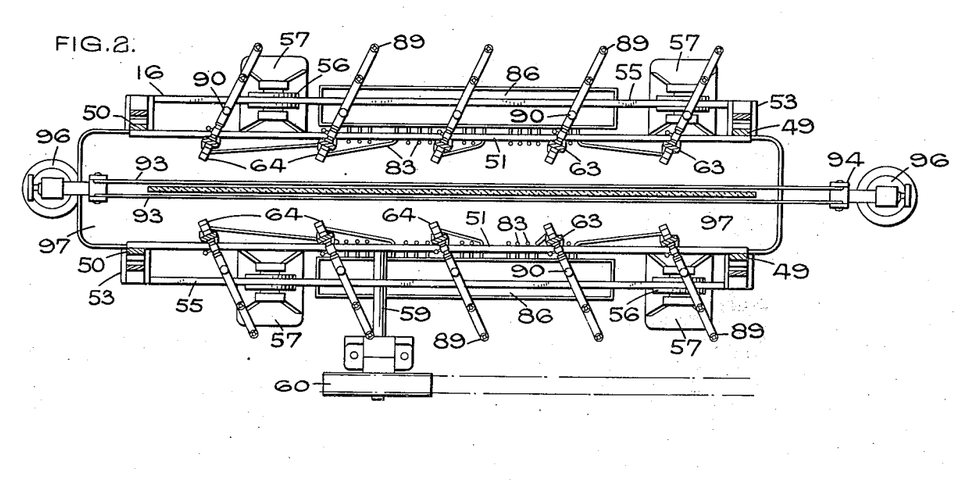
Figure 2 is a sectional plan view on the line 2—2 of Figure 1.

In order to prevent the sprays from cooling the furnace, the central axis of each nozzle is inclined inwardly away from the exit opening of the furnace, and for this purpose the nozzle carriers 63 are secured to the horizontal members 51 of the two frames through the medium of packing pieces 92 of wedge shape, shown in Figures 2 and 9, the angle of inclination between the axes of the nozzles and the adjacent face of the sheet when this is in position between the frames being conveniently approximately 65 degrees. With such an arrangement it will be found that during cooling none or practically none of the spray is directed towards the furnace.

It is preferred in practice to space the nozzles four inches apart in a vertical direction and nine inches apart in a horizontal direction, and to position the frames so that the distance between opposite nozzles is approximately five inches, while the throw of the crank 61 is conveniently arranged such that the overall travel of the frames amounts to seven and a half inches, although dimensions may, of course, be varied somewhat.

By adopting dimensions similar to the above and by supplying air thereto at a pressure of approximately 140 lbs. per square inch, it will be found that with nozzles of a size identical to that depicted in Figures 9 and 10 that the upper and lower edges of adjacent elongated sprays meet adjacent the faces of the glass sheet, so that during cooling there is applied to the surfaces of the sheets layers of cooling medium which are substantially uniform and continuous in a direction along the major axes of the sprays; the overall travel of the frames relative to the stationary sheets being substantially equal to the distance between the adjoining vertical edges of adjacent layers of cooling medium so that the degree of cooling of the faces of the sheets is substantially uniform.

In order to prevent the glass sheets from oscillating laterally relative to the frames during the cooling operation and for ensuring that they will be maintained at an equal distance from the set of nozzles carried by each frame, we provide a pair of horizontal positioning wires 93 spaced apart by a distance somewhat greater than the maximum thickness of sheet normally operated upon, and these wires are supported adjacent the lower edges of the sheets by connecting them at each end to forked members 94 which are carried upon a longitudinal circular bar 95 disposed centrally beneath the rail 22, and each end of the bar is supported from a telescopic stand 96 of known type so that the height of the wires can be varied in accordance with the width of the sheets.

For collecting the pieces of the sheets in the event of fracture occurring during cooling, we provide a longitudinally extending breakage tray 97 supported from the cross strips 53.

For withdrawing the sheets from the heating furnace when they have been raised to the requisite temperature, there is provided withdrawing mechanism comprising an endless horizontal band 98 supported at one end from a pair of pulleys 99 rotatably carried from the adjacent end of the furnace, the opposite end of the band extending around a driving pulley 100 carried rotatably upon a stationary bracket 101, the driving pulley being provided with a suitable handle 102.

The lower horizontal portion of the band is split, the split parts being joined by a connecting piece 103 of inverted U shape to the upper part of which is connected a rod 104, the opposite end of which is secured to one end of the tongs supporting strip 29 as will be apparent from Figure 3.

In order to maintain the band at the requisite tension, the bracket 101 carries an arm 105 pivotally mounted thereon provided at opposite ends with a jockey pulley 106 and tension spring 107.

In tempering glass sheets of square or rectangular shape with apparatus constructed as described above, each sheet is formed initially adjacent each end of one of its longer edges with a pair of indentations formed on opposite faces of the sheet and conveniently made by drilling the faces, and the sheet is then suspended from the rail 22 by allowing the jaws 36 of the tongs shown in Figure 6 to enter the indentations, the stop 38 being adjusted so that the jaws just grip the sheets without actually penetrating beyond the indentations, so that the sheet is now suspended in a vertical position.

The arms of the tongs shown in Figure 7 are then adjusted so that their jaws engage freely the opposite faces of the sheet adjacent the upper edge thereof, and the stops 43 of these tongs positioned so that when on subsequent heating the glass softens, the weight of the latter acting on the tongs causes the jaws to enter the faces by only a limited distance so that damage to the sheet is avoided while at the same time this is supported additionally intermediate its ends.

The doors 47 and 48 adjacent the exit opening 18 of the furnace are now opened and the withdrawing mechanism actuated to advance the sheet into the furnace which has preferably been previously heated to a temperature of approximately 650° C.

The furnace doors are now closed and the sheet heated until it commences to soften, the temperature being then approximately 650° C. whereupon the thermostatic control, where provided, operates to cut off the current supply and the crank and connecting rod mechanism is now driven to reciprocate the frames in the manner described.

The heated sheet is now withdrawn from the furnace by again operating the withdrawing mechanism until it is disposed between the frames, so that the ends thereof are disposed at an equal distance from the adjacent vertical rows of nozzles when the frames are in their central position, a suitable guide being if desired provided to ensure that the sheet is withdrawn into the correct longitudinal position.

The main air control cock 88 is now operated to supply air under a pressure of approximately 140 lbs. per square inch to the nozzle control cocks 67, the correct number of which consistent with the size of the sheet have previously been opened, whereupon a spray of water in a substantially fine state of division is discharged simultaneously on to the two faces of the sheets which are thus cooled rapidly in the known manner and the sheet tempered.

By arranging the nozzles so that the major axis of the elongated spray is vertical and transverse to the direction of reciprocation of the nozzles relative to the sheet and by choosing for the spacing and dimensions of the nozzles and the travel of the frames the values specified above, it will be found that with an air pressure of approximately 140 lbs. per square inch that by suitably operating the control cocks 67 the opposite faces of each sheet can be cooled simultaneously and uniformly over their entire or substantially their entire area.

It is found in practice that a cooling period of between 15 and 30 seconds is sufficient to produce the requisite hardness in the glass, after which it is necessary to cool the glass still further by maintaining the sprays, in order that it can be handled without damage to the workpeople.

As soon as the glass is sufficiently cooled it is removed from the apparatus and the process repeated.

It should be noted that during tempering it is important that the spray should not impinge upon any of the edges of the sheet, and the longitudinal position of the latter on withdrawal from the furnace and also the number of nozzles which are made operable during tempering by adjusting the cocks 67, must in consequence be gauged in accordance with the size of the sheet.

With the present construction, during tempering the liquid is fed to the nozzles automatically by the reduction in pressure produced around the end of the liquid jets 74, but if desired means may be provided for feeding the liquid under pressure to the nozzles. In such event, after the period of approximately 30 seconds has elapsed from the commencement of the cooling operation, by which time the glass will be tempered, the pressure of the water supply may be increased and the air supply turned off so that the glass is finally cooled very rapidly solely by the liquid impinging thereon to a temperature at which it can be conveniently and safely handled.

Instead of withdrawing the sheets from the furnace by means of the withdrawing mechanism shown, this may be dispensed with, and tongs of known construction may be employed for withdrawing the sheets, and in such an arrangement the rail 22 may be extended through and beyond the opposite end of the furnace 15 as indicated at 108 in Figure 1, and the glass sheets, prior to heating, may be suspended from the carriages with the latter upon this portion 108 of the rail, whereupon the carriages complete with sheet are advanced into the furnace 15 through the opening 17 thereof which is made of a form similar to the opening 18, through which the sheets after heating are withdrawn to the cooling apparatus.

In such an arrangement the portion 108 of the rail may be extended somewhat and a preheating furnace fired by gas or other cheap fuel to a temperature lower than that of the furnace 15 may be provided adjacent the opening 17 of the furnace 15, and the rail 108 extended beyond such preheating furnace.

Alternatively, where the preheating furnace is provided, such extension may be dispensed with and the withdrawal mechanism shown in Figure 3 employed.

Figure 13:
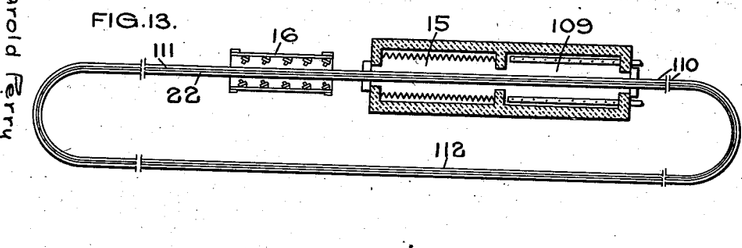
Figure 13 is a diagrammatic plan view illustrating a modified arrangement of plant.

An alternative form of this modification is shown in Figure 13, wherein the preheating furnace is indicated at 109, and the rail 22 is of continuous oval configuration including loading and unloading portions 110 and 111 respectively, and with such an arrangement, the sheet is suspended on the rail when the carriages are on the portion 110 whereupon the latter complete with sheet are advanced into the preheating furnace 109 and the sheet is heated initially through a predetermined degree up to a temperature of, for example, 300°–400° C. whereupon they are advanced into the adjacent electrically heated furnace 15 and heated to the required final temperature and subsequently tempered in the manner described, the carriages being finally advanced to the unloading portion 111 of the rail where the sheet is removed.

After removal, the carriages are advanced in the same direction along the portion 112 of the rail back to the loading portion 110 without passing through the furnaces or tempering apparatus; such an arrangement permitting of fresh sheets to be advanced into the furnaces and to the tempering apparatus during both unloading and loading, so that an appreciable saving in time is effected.

Figure 14:
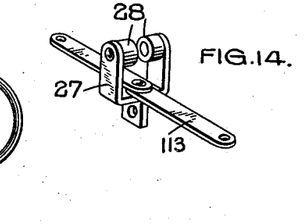
Figure 14 is a detail view of a portion of the plant illustrated in Figure 13.

With such an arrangement, to permit, on removal of the sheets, of the carriages being advanced around the curved parts of the oval rail, the tongs supporting strip 29 may be articulated and constructed from a series of pivotally connected links 113 as will be apparent from Figure 14.

The above described process possesses the advantage that by employing a liquid such as water in addition to air for cooling the sheets the rate of cooling is enhanced as compared with existing processes so that the tempering operation can be carried out more expeditiously.

Further, less compressed air is required for a given size of sheet than is the case with existing processes wherein air alone forms the cooling medium so that the running cost of the process is reduced.

Again it is found that with the process forming the subject of the present invention an unusually uniform fracture is produced, the size of the pieces being in general somewhat larger than that of a pea, while there is very little likelihood of the glass, when tempered, fracturing into the form of splinters or other elongated pieces of a comparatively large size which are capable of inflicting serious cuts or wounds or of causing other damage, so that glass sheets tempered in accordance with the present invention are eminently suitable for use in vehicle windshields.

Although in the above described process we have referred to water as being the liquid employed for effecting the tempering, it should be understood that other liquids may be used, although it is preferred to employ water owing to its high heat capacity. Further, gases other than air may be employed for producing the spray.

The term "sheet glass" used in the appendant claims should be understood as embracing any glass in flat or slightly curved form whether known in the trade under the names "sheet glass," "plate glass" or any other name.

What we claim then is:

1. In a process for tempering sheet glass by cooling rapidly opposite faces thereof when in a heated state, the step which consists in simultaneously discharging upon each face a cooling medium comprising a plurality of substantially regularly spaced sprays of liquid in a fine state of division, said sprays being of elongated form in cross-section with their major axes extending in substantially the same direction, and being substantially continuous over the sheet in a direction along their major axes, while simultaneously moving the sheet and sprays relatively in a direction transverse to the major axes of the sprays and through a distance substantially equal to the distance between adjoining edges of adjacent layers of cooling medium.

2. In apparatus for tempering sheet glass, a plurality of spaced nozzles adapted to discharge liquid simultaneously on opposite faces of the sheet, said nozzles having each a liquid and gas discharge orifice, said gas discharge orifice being arranged concentrically around said liquid discharge orifice, the latter being disposed in advance of said gas discharge orifice, means for supplying liquid simultaneously to each of said liquid discharge orifices, and means for supplying gas under pressure simultaneously to each of said gas discharge orifices to produce a plurality of sprays of liquid in a fine state of division which are adapted to impinge simultaneously on opposite faces of the sheet.

3. In apparatus for tempering sheet glass, a plurality of spaced nozles adapted to discharge a plurality of regularly spaced sprays of cooling medium comprising a liquid in a fine state of division simultaneously upon opposite faces of the sheet, said nozzles being adapted to form sprays of elongated form in cross-section with their major axes extending in substantially the same direction and to apply to the faces of the sheet layers of cooling medium which are substantially uniform and continuous in a direction along the major axes of the sprays, and means for simultaneously moving the sheet and sprays relatively in a direction transverse to the major axes of the sprays through a distance substantially equal to the distance between adjoining edges of adjacent layers of cooling medium.

4. In apparatus for tempering sheet glass, a plurality of spaced nozzles adapted to apply liquid simultaneously to opposite faces of the sheet, said nozzles having each a liquid and main gas discharge orifice arranged concentrically with respect to each other, the nozzles having also a pair of auxiliary gas discharge orifices arranged on opposite sides of the main orifice, means for supplying liquid simultaneously to each of said liquid discharge orifices, means for supplying gas under pressure simultaneously to each of said gas discharge orifices to discharge from each of said nozzles a spray of liquid in a fine state of division, said auxiliary gas discharge orifices of each nozzle being adapted to provide separate streams of gas which converge towards each other and towards the liquid discharged from said liquid discharge orifice to deform the sprays to elongated form in cross-section with their major axes extending in substantially the same direction, and to apply to the faces of the sheet layers of cooling medium which are substantially uniform and continuous in a direction along the major axes of the sprays, and means for simultaneously moving the sheet and sprays relatively in a direction transverse to the major axes of the sprays through a distance substantially equal to the distance between adjoining edges of adjacent layers of cooling medium.

5. In apparatus for tempering sheet glass, means for cooling the glass rapidly, means for suspending the glass sheets during cooling, said cooling means comprising a pair of parallel frames, said frames being spaced apart and adapted to receive therebetween the suspended sheets, a plurality of nozzles carried by each of said frames, said nozzles being arranged symmetrically and in spaced relationship on their respective frames with the nozzles of one frame opposite to and extending towards the nozzles of the other frames, said nozzles having each a liquid and a main gas discharge orifice arranged concentrically with respect to each other, the nozzles having also a pair of auxiliary gas discharge orifices arranged on opposite sides of the main orifice, means for feeding liquid simultaneously to each of said liquid discharge orifices, means for supplying gas under pressure simultaneously to each of said gas discharge orifices to discharge a spray of liquid in a fine state of division, said auxiliary gas discharge orifices of each nozzle being adapted to provide separate streams of gas which converge towards each other and towards the liquid discharged from said liquid discharge orifice to deform the sprays to elongated form in cross section with their major axes extending vertically and in substantially the same direction, and means for reciprocating said frames in a horizontal direction relative to said suspension means.

6. In apparatus for tempering sheet glass, a plurality of spaced nozzles adapted to discharge liquid simultaneously on opposite faces of the sheet, said nozzles having each a liquid and gas discharge orifice, said gas discharge orifice being arranged concentrically around said liquid discharge orifice, means for supplying liquid simultaneously to each of said liquid discharge orifices, and means for supplying gas under pressure simultaneously to each of said gas discharge orifices to produce a plurality of sprays of liquid in a fine state of division which impinge simultaneously on opposite faces of the sheet.

HAROLD PERRY.
A. W. GROTEFELD.